United States Patent
Damodaran et al.

(10) Patent No.: US 7,805,644 B2
(45) Date of Patent: Sep. 28, 2010

(54) MULTIPLE PBIST CONTROLLERS

(75) Inventors: Raguram Damodaran, Plano, TX (US); Umang Bharatkumar Thakkar, San Diego, CA (US); John David Sayre, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 417 days.

(21) Appl. No.: 11/967,148

(22) Filed: Dec. 29, 2007

(65) Prior Publication Data

US 2009/0172487 A1 Jul. 2, 2009

(51) Int. Cl.
*G11C 29/00* (2006.01)
*G01R 31/28* (2006.01)

(52) U.S. Cl. .................... 714/718; 714/48; 714/734

(58) Field of Classification Search ............... 714/718, 714/719, 723, 724, 726, 733, 734, 57, 48
See application file for complete search history.

(56) References Cited

U.S. PATENT DOCUMENTS

| | | | |
|---|---|---|---|
| 6,158,032 A * | 12/2000 | Currier et al. ............... | 714/726 |
| 6,574,762 B1 * | 6/2003 | Karimi et al. ............... | 714/727 |
| 6,988,232 B2 * | 1/2006 | Ricchetti et al. ............ | 714/736 |
| 7,260,759 B1 * | 8/2007 | Zarrineh et al. ............. | 714/733 |
| 7,284,167 B2 * | 10/2007 | Lee et al. .................... | 714/718 |
| 2002/0138801 A1 * | 9/2002 | Wang et al. .................. | 714/729 |
| 2003/0120985 A1 * | 6/2003 | Slobodnik et al. ........... | 714/718 |
| 2005/0172180 A1 | 8/2005 | Damodaran et al. | |
| 2006/0156133 A1 * | 7/2006 | Mukherjee et al. .......... | 714/733 |
| 2007/0006033 A1 | 1/2007 | Damodaran et al. | |
| 2007/0033469 A1 | 2/2007 | Damodaran et al. | |
| 2007/0033470 A1 | 2/2007 | Damodaran et al. | |
| 2007/0033471 A1 | 2/2007 | Damodaran et al. | |
| 2007/0033472 A1 | 2/2007 | Damodaran et al. | |
| 2008/0016421 A1 * | 1/2008 | McDevitt .................... | 714/733 |

OTHER PUBLICATIONS

Chih-Tsun Huang; Jing-Reng Huang; Chi-Feng Wu; Cheng-Wen Wu; Tsin-Yuan Chang; , "A programmable BIST core for embedded DRAM," Design & Test of Computers, IEEE, vol. 16, No. 1, pp. 59-70, Jan.-Mar. 1999 doi: 10.1109/54.748806.*

Xiaogang Du; Mukherjee, N.; Wu-Tung Cheng; Reddy, S.M.; , "Full-speed field-programmable memory BIST architecture," Test 10.1109/TEST.2005.1584084.*

Xiaogang Du; Mukherjee, N.; Wu-Tung Cheng; Reddy, S.M.; , "Full-speed field programmable memory BIST supporting multi-level looping," Memory Technology, Design, and Testing, 2005. MTDT 2005. 2005 IEEE International Workshop on , vol., No., pp. 67-71, Aug. 5-5, 2005 doi: 10.1109/MTDT.2005.25.*

* cited by examiner

*Primary Examiner*—Cynthia Britt
(74) *Attorney, Agent, or Firm*—John R. Pessetto; W. James Brady; Frederick J. Telecky, Jr.

(57) ABSTRACT

A system on a single integrated circuit chip (SoC) includes a plurality of operational circuits to be tested. A plurality of programmable built-in self-test (pBIST) controllers is connected to respective ones of the plurality of operational circuits in a manner that allows the pBIST controllers to test the respective operation circuits in parallel. An interface is connected to each of the plurality of pBIST controllers for connection to an external tester to facilitate programming of each of the plurality of pBIST controllers by the external tester, such that the plurality of pBIST controllers are operable to test the plurality of operational circuits in parallel and report the results of the parallel tests to the external tester, thereby reducing test time.

13 Claims, 4 Drawing Sheets

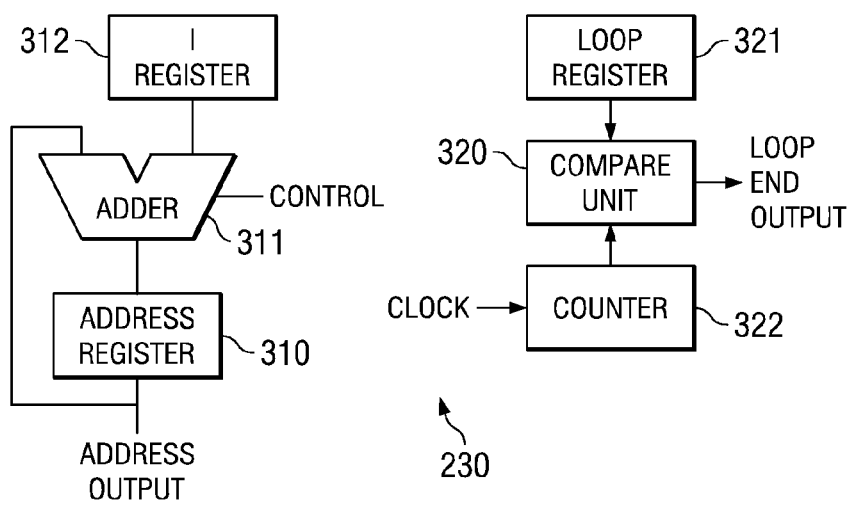
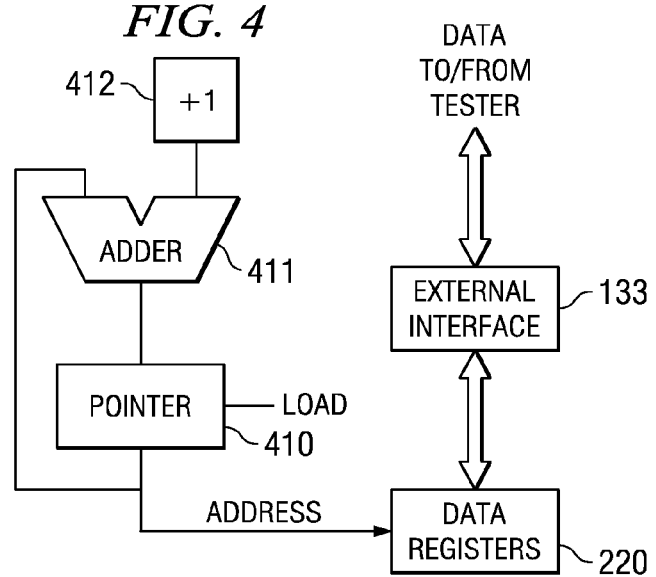

US 7,805,644 B2

MULTIPLE PBIST CONTROLLERS

FIELD OF THE INVENTION

This invention generally relates to testing of integrated circuits and in particular to programmable built-in self testing of integrated circuits.

BACKGROUND OF THE INVENTION

Testing fabricated integrated circuits to determine proper operation has always been a difficult problem. There are two major types of errors. A design defect means that the integrated circuit was manufactured to a design not proper for the intended purpose. Such a defect will effect every integrated circuit until the design is changed. The integrated circuit manufacturer must detect and correct such defects before shipping large number of parts to customers to avoid a costly recall. A manufacturing defect involves some fault in the manufacture of the integrated circuit that will affect less than all parts manufactured. Such defects are corrected by identification and correction of the manufacturing fault.

Most integrated circuit manufacturers test integrated circuits for proper function before shipment to customers. With the increase in integrated circuit complexity this testing is increasingly difficult. Many manufacturers rather than rely on increasingly expensive external testing devices test integrated circuits using a technique called built-in self test (BIST). BIST involves using circuits manufactured on the integrated circuit to test the integrated circuit. When triggered either automatically in circuit operation of by an external test device, the BIST circuits produce a set of test conditions run on the ordinary circuit hardware. Comparison of the state of the integrated circuit following test to an expected state indicates whether the integrated circuit passed the test. An example of such a test is writing to a read/write memory and recalling the data written. A match between the data written and the data read results in passing the test. BIST typically involves other more complex tests.

A subset of BIST is programmable built-in self test (pBIST) that uses a general purpose test engine programmed by a set of instructions. This set of test instructions is typically stored on the integrated circuit in a read only memory (ROM) storing test instructions particularly developed for that integrated circuit. pBIST enables re-use of hardware and test instructions to cover a family of similar but not identical integrated circuits.

A description of an exemplary set of instructions for use in a pBIST is described in US Patent Application 20070033469 entitled "ROM-Based Memory Testing" and is incorporated by reference herein in its entirety.

SUMMARY OF THE INVENTION

An embodiment of the present invention provides a system on a single integrated circuit chip (SoC) that includes a plurality of operational circuits to be tested. A plurality of programmable built-in self-test (pBIST) controllers is connected to respective ones of the plurality of operational circuits in a manner that allows the pBIST controllers to test the respective operational circuits in parallel. An interface is connected to each of the plurality of pBIST controllers for connection to an external tester to facilitate programming of each of the plurality of pBIST controllers by the external tester, such that the plurality of pBIST controllers are operable to test the plurality of operational circuits in parallel and report the results of the parallel tests to the external tester.

BRIEF DESCRIPTION OF THE DRAWINGS

Particular embodiments of the invention will now be described, by way of example only, and with reference to the accompanying drawings, in which:

FIG. 3 is a block diagram of the address generation unit of the programmable built-in self test unit of FIG. 2;

FIG. 4 illustrates the auto-increment feature for reads and writes to the data registers of the programmable built-in test unit of FIG. 2;

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors or digital systems on a chip. An ASIC may contain one or more megacells which each include custom designed functional circuits combined with pre-designed functional circuits provided by a design library.

Figure 1:
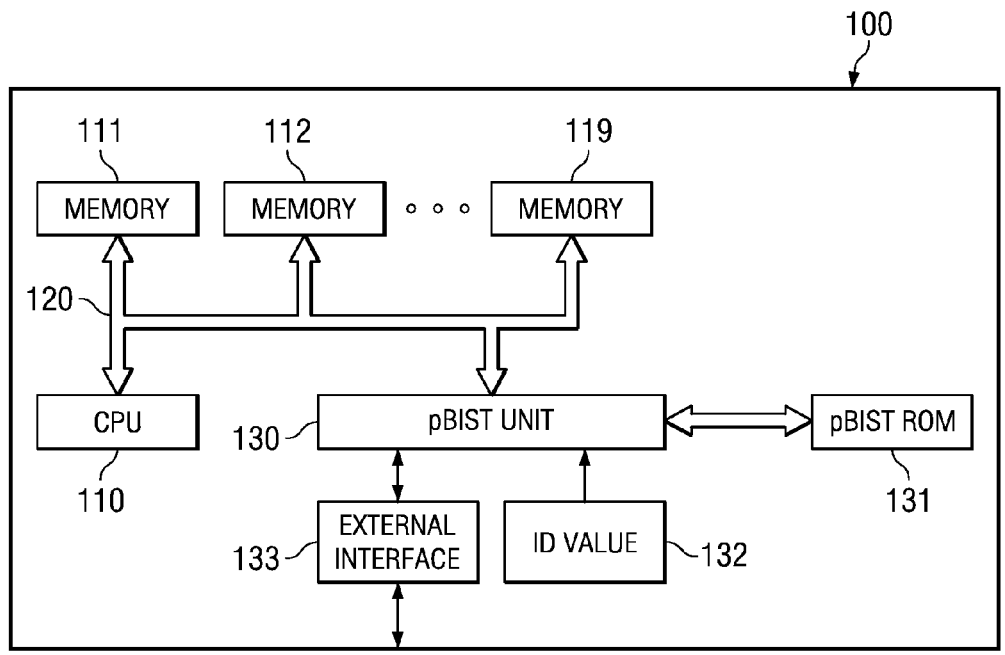
FIG. 1 is a block diagram of a representative integrated circuit including a programmable built-in self test unit that embodies aspects of the present invention.

FIG. 1 illustrates a representative integrated circuit (IC) 100 including a programmable built-in self test (pBIST) controller 130. Integrated circuit 100 contains a multi-module system on a chip (SoC) and can be quite complex to test due to the number of modules that are included on-chip in the system. In this embodiment, SoC 100 includes central processing unit (CPU) 110 and memories 111, 112 . . . 119 coupled by bus 120. These circuits are merely representative of circuits embodied in an integrated circuit including pBIST 130. Other embodiments may include multiple processors, complex assemblages of memory and cache subsystems, peripheral devices and interfaces, various types memory storage such as random access memory (RAM), read only memory (ROM) and various types of alterable or flash ROMs, for example.

The programmable built-in self test unit includes pBIST controller 130, pBIST ROM 131 and external interface 133. pBIST controller 130 controls the tests in much the same fashion as CPU 110 controls operation of integrated circuit 100. pBIST unit 130 is controlled by test instructions stored in pBIST ROM 131. pBIST unit 130 may couple to circuits outside integrated circuit 100 via external interface 133. FIG. 1 illustrates pBIST unit 130 coupled to CPU 110 and memories 111, 112 . . . 119 via bus 120. This connection is merely illustrative of the type of connection between pBIST unit 130 and other circuits of integrated circuit 100.

pBIST controller 130 also includes a scheme for selecting a particular pBIST controller within a group of pBIST controllers by using a pBIST ID (identification) value 132. In this embodiment, the pBIST ID value is a five-bit value that allows selection of up to thirty-one pBIST controllers. The ID value for each controller is arranged to be a unique value between 1 and 31, (0x01-0x1F). The ID value 0x00 is reserved to indicate a broadcast mode in which a group of pBIST controllers all respond to a same command transaction. The operation of multiple pBIST controllers in parallel will be described in more detail below.

Figure 2:
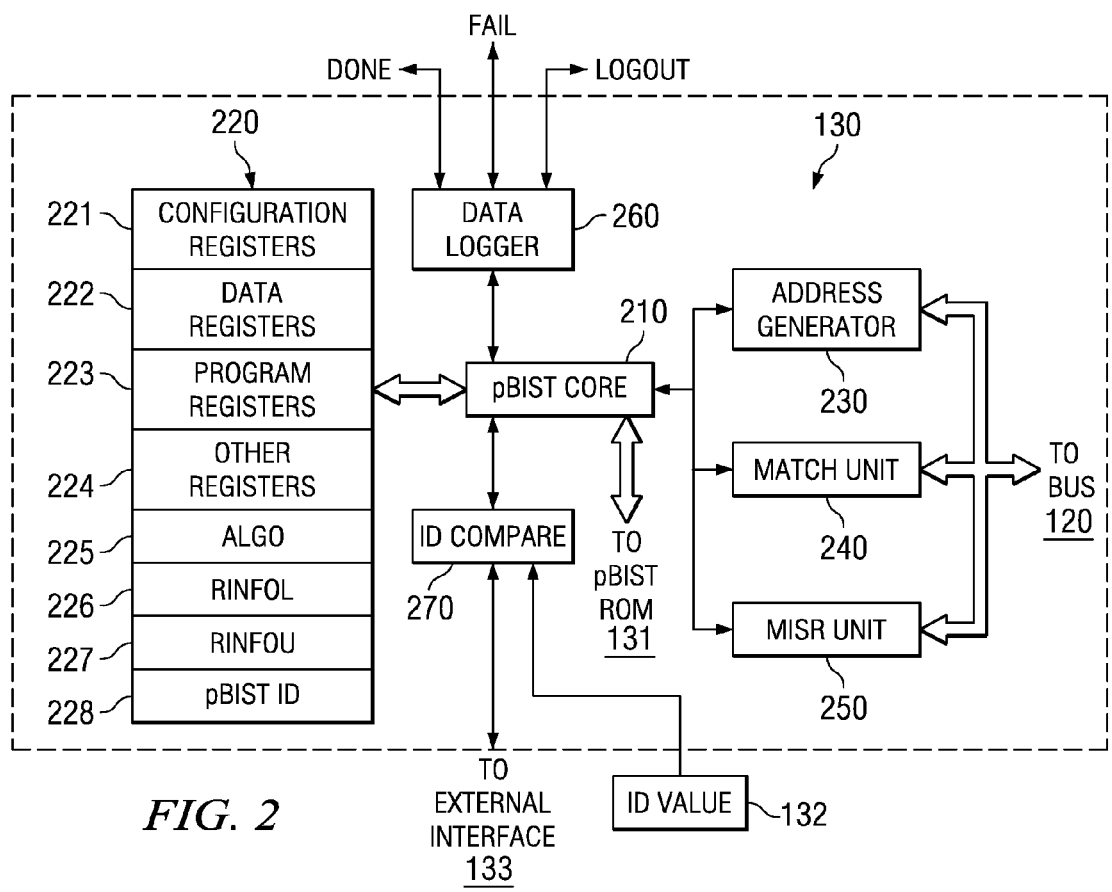
FIG. 2 is a more detailed block diagram of the exemplary programmable built-in self test unit of FIG. 1.

FIG. 2 is a more detailed block diagram of an exemplary programmable built-in self test unit 130 that embodies aspects of the present invention. pBIST unit 130 includes pBIST core 210, registers 220, address generator 230, match unit 240 and multiple input signature register (MISR) unit 250. pBIST core 210 is the center of pBIST unit 130. An example pBIST is described in US Patent application 2005/0172180 entitled "Programmable Built in Self Test of Memory" and is incorporated by reference herein in its entirety. pBIST core 210 is coupled to registers 220, pBIST ROM 131, external interface 133, address generator 230, match unit 240 and MISR unit 250. Interaction of pBIST core 210 with these circuits will be further described below.

Registers 220 are memory mapped within the address space of CPU 110 in this embodiment. Thus CPU 110 can read from or write to any register within registers 220 by a memory operation to a corresponding address. Registers 220 include configuration registers 221. Configuration registers 221 control the configuration of pBIST unit 130 and the operational mode of pBIST unit 130. Data registers 222 store test data recalled from pBIST ROM 131 in a manner more fully described below. Program registers 223 store test program instructions recalled from pBIST ROM 131 in a manner more fully described below. Other registers 224 include miscellaneous registers. Registers 220 includes three registers described in detail below: ALGO register 225; RINFOL register 226; and RINFOU 227.

The ALGO register 225 is an algorithm mask register. Bit [0] of this register indicates whether the first algorithm stored in the ROM would be executed or not. Bit [1] indicates whether the second algorithm is executed and so on. A total of 32 algorithms can be stored in the ROM as is determined by the data width of ALGO register 225. For an algorithm to be executed, both the corresponding bit of the ALGO register and a valid bit in the previous algorithm header must be set.

The upper and lower RAM information (RINFOU/L) group mask registers RINFOL register 226 and RINFOU register 227 are similar to ALGO register 225. RAM group mask registers RINFOL register 226 and RINFOU register 227 indicate whether a particular RAM group is executed or not. This capability is provided because not all algorithms can be run on all memories. For a particular RAM group to be executed, the corresponding bit in RINFOL register 226 or RINFOU register 227 and the valid bit in the previous RAM group header must both be set. RINFOL register 226 indicates the validity of RAM groups 0 to 31 and RINFOU register 227 indicates the validity of RAM groups 32 to 63.

PBIST ID register 228 is a memory mapped register that is loaded with a pBIST ID at the beginning of a programming sequence to specify which of a multiple of pBISt controllers is being programmed by an external tester or by the local CPU 110. Upon being reset, pBIST register assumes a value of 0x0000. Each pBIST controller is assigned a unique ID value 132 when the SoC integrated circuit is designed. This may be embodied by simply tying off the five-bit field to either a high or to a low reference voltage to form the five-bit ID value. The process of programming each pBIST controller will be described in more detail below.

Address generator 230 includes two address generators used in accessing memory, such as memories 111, 112 . . . 119. FIG. 3 illustrates a block diagram of one of these address generators. Address generator 230 includes address register 310, adder 311, increment register 312, compare unit 320, loop count register 321 and counter 322. In this embodiment the initial values of address register 310, increment register 312 and loop count register 321 are recalled from pBIST ROM 131. Adder 311 is controlled via a control input in one of three modes. In a non-increment mode, adder 311 returns an address output equal to the recycled value of address register 310. The value of address register 310 is thus unchanged. In an increment mode, adder 311 adds the values stored in address register 310 and increment register 312. The sum value is stored in address register 310 for the next iteration. The decrement mode is similar to the increment mode, except adder 311 subtracts the value of increment register 312 from the value of address register 310. The difference value is stored in address register 310 for the next iteration. The initial value of loop count register 321 sets the number of iterations in the loop. Compare unit 320 compares the value of loop count register 321 with the value of counter 322. Upon starting a test, counter 322 is reset to zero. The count of counter 322 advances by one each cycle of the clock input. Compare unit 320 generates a loop end output when these two values match.

MISR unit 250 is mainly used for testing other chip-level ROMs. However, it can also be used to test any memory using any algorithm. When MISR unit 250 is used, the return data from the memories is not compared to expected data; instead the read data is fed directly into MISR unit 250. The following polynomial is used by MISR unit 250: $x^{32}+x^{22}+x^2+x+1$. The tap points are bits 31, 30 and 10. The default value at the MISR output after reset is: 0xAAAAAAAA. At the end of the memory test, the MISR signature is compared with the expected signature in the data register D1:D0 within other registers 224 to determine whether the test is passed or failed.

Cumulative MISR mode is different from the MISR mode in two ways. First, the MISR signature comparison with the expected signature is done after testing all the memories in a particular RAM group and not after each individual memory. Second, this mode gives the programmer the capability to initially load a background pattern in data registers D1:D0 and E1:E0 within other registers 224 for the memory testing. After the memory testing is over, this mode loads a new value into these registers in order to use as expected signature. In other words, the first D1:D0 and E1:E0 values serve as the background pattern and the second D1:D0 and E1:E0 values serve as the expected signature. Any additional values for D1:D0 and E1:E0 will be ignored. Thus in CMISR mode, only the first two pairs of D1:D0 and E1:E0 values are used.

Data logger 260 captures the failure information detected by match unit 240 and MISR unit 250 and generates status signals "done" and "fail". An external tester can monitor the done and fail status signals to determine when testing is completed. The logout bus can be interrogated by an external tester in order to determine access the logged error data in order to determine what type of error was detected when a failure is indicated.

A VLCT protocol is used to reduce the time to program internal registers in pBIST controller 130 from an external very low cost tester (VLCT). In addition to permitting reads of internal registers of pBIST 130 controller this protocol enables for better debugging of the SoC IC.

The protocol includes a command phase and a data phase. During the command phase, the VLCT provides a command, the address for which the command is directed and the number of data cycles that are going to follow this command phase. As an example, assume there are sixteen bits available for a program command word. Table 1 lists a division of these sixteen bits for the command phase

TABLE 1

| Command phase bits | | |
|---|---|---|
| [15:14] | [13:6] | [5:0] |
| command | address | data count |

For writes, the write command, write address and subsequent number of data cycles to follow the command phase are driven on a program bus that connects to external interface 133. For reads, the read command, read address and the number of data cycles to wait for the data to be available are driven on this bus. The exact details of the program bus are not critical and it may be a serial bus or a parallel bus of various widths, as appropriate for the SoC and test facility. In this embodiment, the program bus is a serial bus.

If a write is intended, the data-count has a value=1. If data-count is 0, then no write would happen and the next command can be issued in the very next cycle. Address bits [12:6] specifies the word address to write to or read from in data registers 220 in pBIST unit 130. Bit (13) of this address is ignored in this embodiment since the number of registers does not require it. The command field has the values specified in Table 2.

TABLE 2

| Command values | |
|---|---|
| | command |
| 00 | No operation—NOOP |
| 01 | Write |
| 10 | Read |
| 11 | NOOP |

During the data phase, the data that needs to get written to this address is driven on the same program bus. As long as data-count from the command phase is one, this bus will continue to carry 16-bit write data in subsequent cycles. After every data phase cycle where a new write data is driven, the value in data-count is automatically decremented by one. When data-count becomes zero, then there are no more data phase cycles left. The VLCT interface logic 133 would then automatically start monitoring the program bus for new commands.

For 32-bit writes, the data-count needs to be set to a value of two, and the two cycles following the initial command phase will carry this 32-bit data (16 bits per cycle). To illustrate this more, consider the following example in Table 3.

TABLE 3

| command phase example | |
|---|---|
| Command phase | 0x4002 |
| Data phase | Cycle 1: 0x1FBD |
| | Cycle 2: 0x2A00 |

The command 0x4002 would be interpreted as a command word as shown in Table 4.

TABLE 4

| command word mapping | | |
|---|---|---|
| [15:14] | [13:6] | [5:0] |
| 01 | 00000000 | 000010 |

The command phase in this example implies that the command is a write to address hex 00 and that there are 2 cycles of data to follow. So the 32-bit value hex 2A001FBD would get written into this address location.

There is another advantage of doing things this way. For instance, let us assume a 16-deep 32-bit wide register file needs to be loaded with data. Following this protocol, this entire register file can be written using just a single command. To accomplish this, the programmer should issue the command hex 4020. This command decodes to indicate that there are 32 16-bit data cycles to follow; two for each line of this register file. In this case, the write to "0x0000" is automatically detected as a 32-bit write in hardware. So after every two data cycles, as long as data-count stays greater than or equal to one, the word address is incremented by four and the data carried in the subsequent two cycles would form the write data for this newly calculated address.

Of course, each of these lines in the register file could also be written to one after the other by issuing separate commands with data-count equal to two for each command.

For reads, data-count specifies the number of cycles to wait after a read command is issued. The output data of the register addressed by address will be returned on the read data bus.

To explain this with an example, assume a read of an internal 32-bit register with a value of fourteen in the data-count field. pBIST unit 130 will stop monitoring the program bus for the next fourteen cycles after the command has been issued. The next VLCT command can only be issued on the fifteenth cycle. The lower sixteen bits of the return data from this register would be available on the twelfth cycle and the upper sixteen bits would be available on the thirteenth cycle. The fourteenth cycle is a dead cycle to support the cases where a single input/output bus is used for both program and read. In this case, the output enables for this bus could be switched back to write mode from read mode during this fourteenth cycle.

To generalize the above, the lower sixteen bits will be available in data-count-two cycle and the upper sixteen bits will be available in data-count-one cycle. The data-count cycle is a dead cycle during which the output enable could be switched, if needed.

If a read of an internal sixteen bit register is issued, then the return data will be available in the data-count-two cycle just like before. This data will stay the same and will not switch during the subsequent two cycles. Data-count is six-bits so a maximum of 63 wait cycles can be specified after every read command.

The value to use for data-count depends on the internal clock frequency of pBIST unit 130. In other words, the exact time it takes to get the return data once the read address is issued depends entirely upon the internal pBIST clock frequency. The number of cycles to wait to get the return data should be calculated based on the following formula:

If reading register file data, $$D(\text{in } tck \text{ cycles}) = 6*tck + |(5*clkp)/tck_{rounded}$$

If reading any other register data, $$D(\text{in } tck \text{ cycles}) = 6*tck + |(3*clkp)/tck_{rounded}$$

Here tck represents the tester clock period and clkp represents the internal pBIST clock period. It takes two extra cycles to read the register file data because the access is pipelined on both sides of the register file due to timing considerations.

The input driver on the program bus can be tri-stated for the number of cycles specified in data-count. If the test designer specifies a data-count value of less than ten, then it is effectively treated as ten internal to pBIST. In other words, the minimum data-count value that should be used is ten.

FIG. 4 illustrates example hardware used in pBIST unit 130 to implement this protocol. Pointer 410 is loaded with the address from the address field of data received during the command phase. The initial data cycle uses this address to access the desired location within data registers 220. Following each data phase, adder 411 adds +1 from register 412 to the contents of pointer 410. The sum is stored in pointer 410 serving as the address for the next data cycle.

Figure 5:
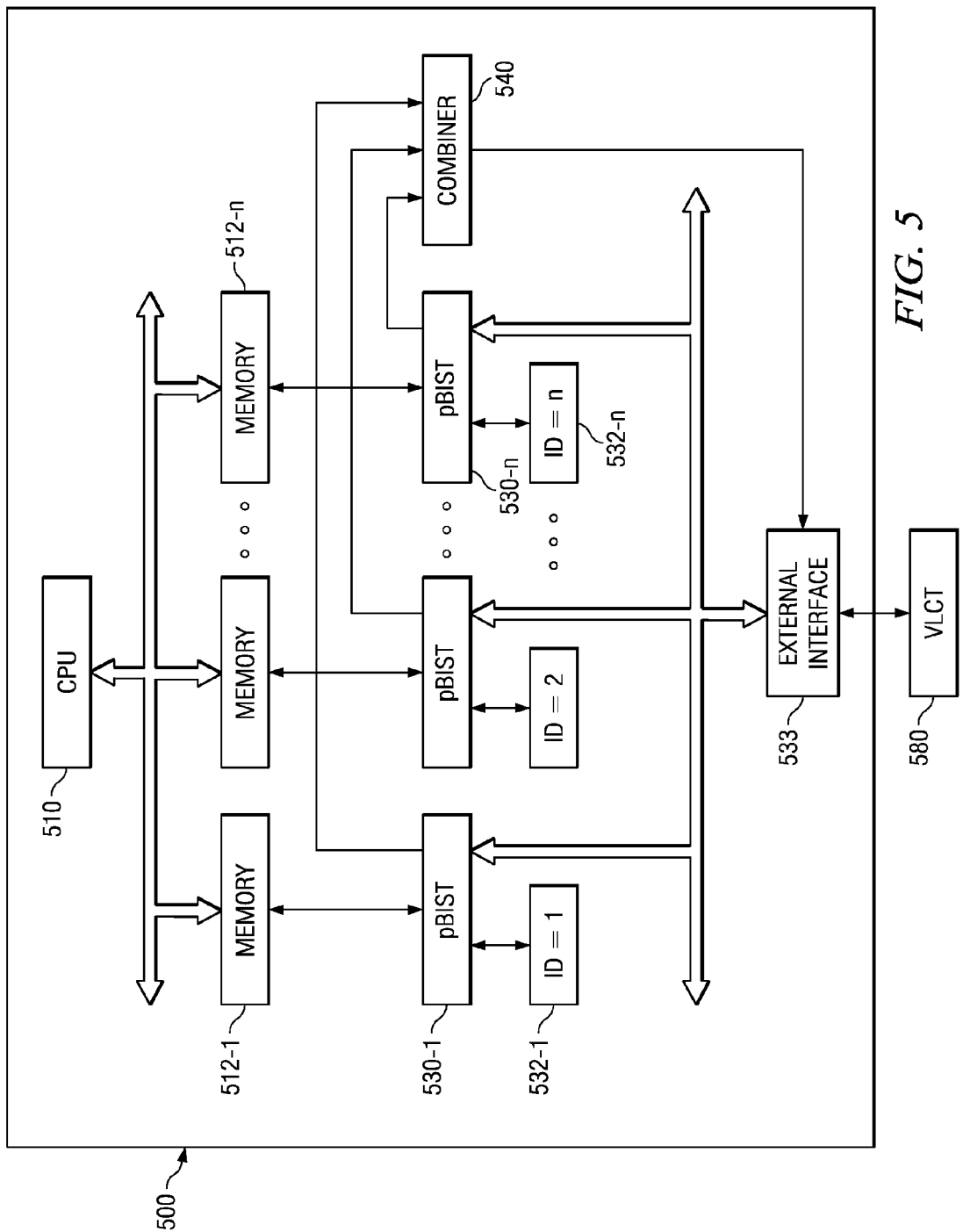
FIG. 5 is a block diagram illustrating multiple programmable built-in self test controllers of FIG. 2 on one integrated circuit.

FIG. 5 is a block diagram illustrating multiple programmable built-in self test controllers of FIG. 2 on one SoC integrated circuit 500. In this exemplary SoC embodiment, one processor 510 is illustrated connected to multiple memory modules 512-1, 512-n. In other embodiments there may be multiple processors connected to selected ones of the memory modules, complex assemblages of memory and cache subsystems, peripheral devices and interfaces, various types memory storage such as random access memory (RAM), read only memory (ROM) and various types of alterable or flash ROMs, for example.

There are also multiple pBIST controllers 530-1, 530-n which are each similar to or the same as pBIST controller 130 of FIG. 2. Each pBIST controller 530-n has an associated five-bit identification field 532-1, 532-n. The five-bit ID value for each controller has a unique value between 1 and 31, (0x01-0x1F). This may be embodied by simply tying off the five-bit field to either a high or to a low reference voltage to form the five-bit ID value. The ID value 0x00 is reserved to indicate a broadcast mode in which a group of pBIST controllers all respond to a same command transaction. Each pBIST controller is connected directly to an associated memory module 512-1, 512-n and can test that module while the other pBIST controllers test their associated memory modules in parallel. Thus, up to thirty one memory modules may be tested in parallel and therefore greatly reduce the test time.

While this embodiment illustrates memory modules being tested in parallel, it is to be understood that any type of functional module that is amenable to testing by a pBIST controller can be connected to a dedicated pBIST controller in another embodiment and thereby tested in parallel with other functional modules. Similarly, each memory module may be comprised of one or more memory blocks interconnected to the pBIST.

Each pBIST controller contains a pBIST ID register 228 as described with reference to FIG. 2 that is a memory mapped register that is loaded with a pBIST ID at the beginning of a programming sequence to specify which of the multiple pBIST controllers is being programmed by an external tester 580 via external interface 533 or by the local CPU 510. Upon being reset, each pBIST ID register assumes a value of 0x0000. By default, a value of 0x0000 means broadcast to all controllers. Each pBIST ID register is memory mapped to the same address, 0x184 in this embodiment; therefore, one write operation will write the same data value to all of the multiple pBIST ID registers Each pBIST controller will accept commands provided by external tester 580 if the associated pBIST register has a value of 0x0000 or if the associated register has a value that equals ID value 132-n as determined by ID compare logic 270 illustrated in FIG. 2; otherwise the pBIST controller will ignore commands that are being sent on the program bus.

Each pBIST controller 530-1, 530-n also includes a pBIST ROM for holding test algorithms. In another embodiment, all of the pBIST controllers may have access to a shared pBIST ROM. Each pBIST controller contains a set of special functional units of differing types that are each controlled by a corresponding part of an alterable set of instructions, such that the pBIST is operable to perform a sequence of memory test operations according to the alterable set of instructions. Each pBIST controller includes data logging circuitry to compare data read from the associated RAM with expected results that had been written to the RAM.

Figure 6:
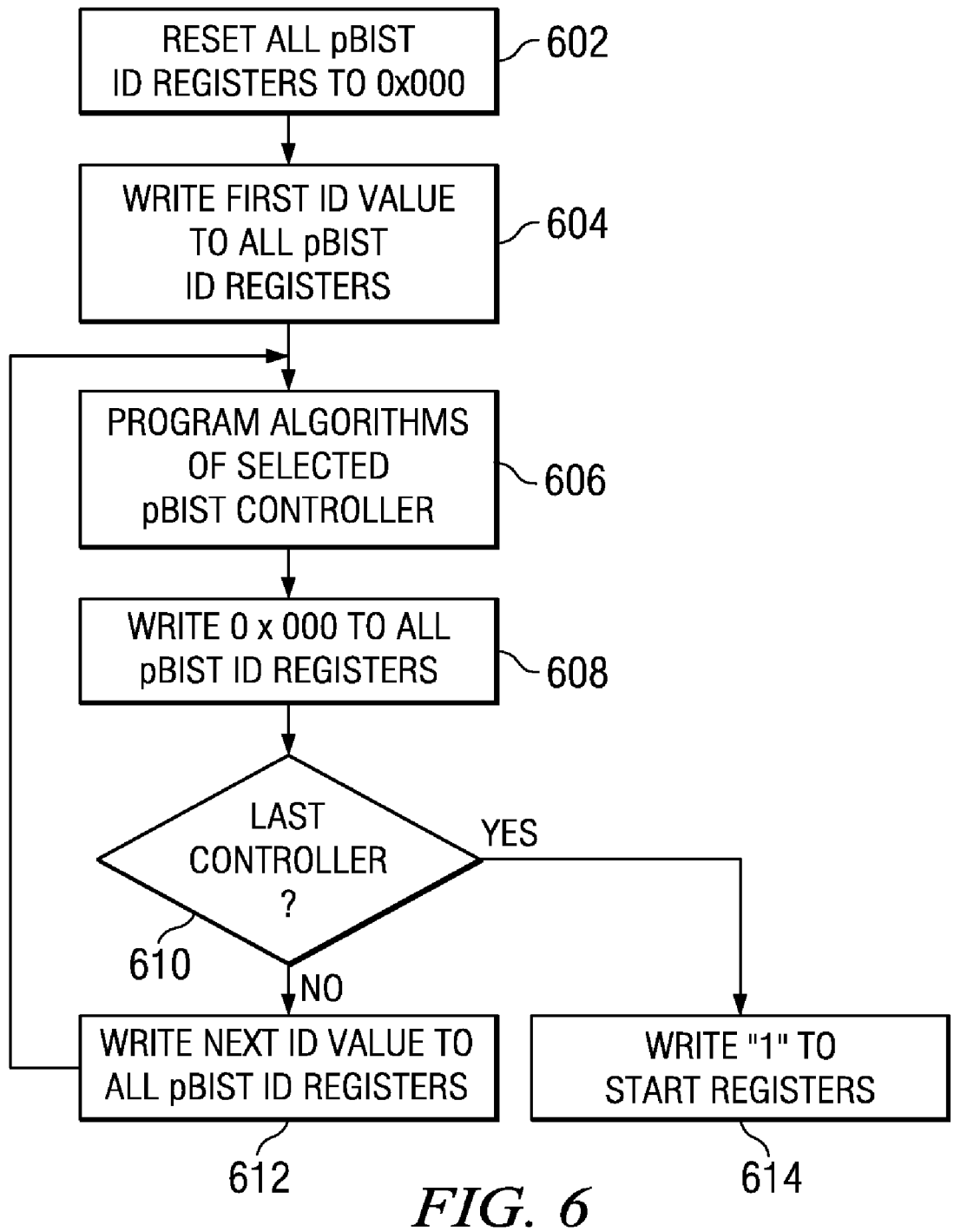
FIG. 6 is a flow diagram illustrating programming of the multiple pBIST controllers of FIG. 5.

FIG. 6 is a flow diagram illustrating programming of the multiple pBIST controllers 530-1, 530-n. Initially, all pBIST ID registers are initialized at operation 602 to 0x0000 either by a reset operation or by writing a value of 0x0000 to the pBIST ID register address. As discussed above, as single write transaction will load the same data value in all of the pBIST ID registers. External tester 580 then writes 604 the ID value of the first one of the multiple pBIST controllers that is to be programmed into all of the pBIST ID registers in a single write transaction. For example, if the first pBIST controller to be programmed has an ID of 0x01, then 0x01 is written to all of the pBIST ID registers. At this point, now only the first pBIST controller will accept commands placed on the program bus by the external tester. This allows all of the pBIST controllers to have their registers 220 memory mapped to the same set of addresses, but allows programming the registers of a selected pBIST controller while the other pBIST controllers ignore the programming transactions.

The external tester performs write operations 606 as needed to program the test algorithms that are to be executed by the first pBIST controller. This is performed using the various commands of the VLCT protocol described above. At the completion of programming the first controller, the external tester writes 608 an ID value 0x0000 to all of the pBIST ID register in a single write transaction so that all of the pBIST will monitor the next command.

A check 610 is made to determine if the last controller has been programmed. If not, the process repeats by writing 612 the next pBIST ID values to all of the pBIST ID registers and then programming 606 the selected pBIST controller as described above. For example, if the next controller is the second controller, then an ID value of 0x02 will be written to all of the pBIST ID registers and the second controller will then be programmed.

Once all of the controllers have been programmed in this manner, a data value of 0x0001 is written to the start registers in a single write transaction 614 to start testing. In this manner, each of the pBIST controllers can be programmed individually to test the particular functional module to which each controller is directly connected, and then to perform all of the testing in parallel in order to reduce test time. This method can be used to program one, more than one, or all of the controllers on the SoC integrated circuit 500.

Referring again to FIG. 5, the status signals from each of the pBIST controllers are routed to combiner module 540 where the status of each pBIST controller is logged. In this embodiment, the status signals include fail, and done. Combiner module 540 combines each status signal type into a composite status signal that reflects the combined results of all of the pBIST controllers. Thus, combiner 540 provides composite fail, and done status signals. While the test is proceeding, external tester 580 can monitor the composite status signals to determine when testing is done. If a failure is detected by one or more of the pBIST controllers, the composite fail status signal will be asserted.

In diagnostic mode, external tester 580 can scan out test results from all of the pBIST controllers by interrogating the logout bus on each pBIST controller. In this embodiment, scanning is performed using an IEEE 1149.1 (JTAG) test access port (TAP) that is part of external interface 533. JTAG TAP embodiments are well known and do not need further description here. In another embodiment, the logout buses may be interrogated by an external tester using a parallel bus having multiple data bit lines. In this embodiment, each pBIST controller provides the information summarized in Table 5 when it is scanned.

TABLE 5 scanned logout data from each controller

| [104:100] | [99] | [98:93] | [92:85] | [84:80] | [79:64] | [63:0] |
|---|---|---|---|---|---|---|
| pBIST ID# | Port # | Algorithm # | RGS | RDS | FSRA | FSRD |

The port # identifies which port detected a failure. In this embodiment, two memory access units are provided to allow for dual accesses to the memory being tested. Other embodiments may have only one port or more than two ports.

The RAM Group Select (RGS) value is from a RAM grouping address register that has been included within each pBIST in order to support more than 32 RAMs. This extends the total number of RAMs that can be tested from 32 to 8192 RAMs of 32 bits or less. RAMs with data width larger than 32 will be tested as more than one RAM and data logged separately.

The Return Data Select (RDS) value is from the return data select register that used for selecting memory return data for selected RGS group. Only 5 bits of RDS are used in this embodiment for memory select purposes. Eight bits of RGS and five bits of RDS give flexibility to test 8192 RAMs of 32 bits or less.

The Fail Status Address Register (FSRA) value is the memory address of the first failure. Internally, they are 16 bits wide each, but are zero filled to 32 bits on reads. There are sixteen 16-bit wide datalogger registers in order to capture addresses of the failures subsequent to the first failure. These are read only registers. The default value of these registers is 8'h00000000.

The Fail Status Data Registers (FSRD) value is the failure data in case of failures. There is one set of fail status data registers for each port. Also, depending on the pBIST controller mode, these registers also hold the return data from the memories (IDDQ and EMU modes) or the MISR signature (MISR and CMISR modes).

In addition to these FSRD registers, there are also 16 32-bit wide datalogger registers (or register files, depending on the particular configuration) for capturing subsequent failures. When the first failure occurs, pBIST controller stalls but continues executing the instructions already in the instruction pipeline. While the failure data from the first failure is scanned out, any further failures are captured into these datalogger registers. These FSRD registers are read only. The default value is 8'hAAAAAAAA.

With the information scanned from each pBIST controller a user of the external tester can identify for each pBIST controller what address and which memory failed. Depending on memory type a repair operation may be performed by substituting a reserve memory column or row for a failed column or row.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, more than thirty-one pBIST controllers could be supported by increasing the size of the pBIST value from five bits to six or more bits.

In another embodiment, the capability or operation of the pBIST controller could be modified or enhanced to increase or decrease the functionality and/or capability of the controller.

In various embodiments, the multiple pBIST controllers may share a same ROM for holding algorithms, or each controller may have a closely associated ROM.

In another embodiment, the algorithm ROM may be replaced or augmented with a writable RAM memory to allow further programmability.

In another embodiment, the types of functional units within each pBIST controller may be adapted to allow better testing of a particular type of operational circuit that is directly connected to a particular pBIST.

In another embodiment, a different type of selection mechanism may be employed to allow each pBIST controller to be programmed. For example, each set of control registers may be memory mapped at a different set of address. In another example, the VLCT protocol may be extended to allow greater addressing flexibility to allow commands to be written to explicitly addressed pBIST controllers. Regardless of the scheme for programming the pBIST controllers, embodiments of multiple pBIST controllers that are operable to test multiple logic modules or memory modules in parallel are within the intent of the present invention.

While embodiments of the invention are intended for use with external low cost testers, there is no reason not to use embodiments of the present invention in test facilities that use more complex testers.

It is therefore contemplated that the appended claims will cover any such modifications of the embodiments as fall within the true scope and spirit of the invention.

What is claimed is:

1. An integrated circuit comprising:
   a plurality of operational circuits to be tested;
   a plurality of programmable built-in self-test (pBIST) controllers connected to respective ones of the plurality of operational circuits;
   an interface connected to each of the plurality of pBIST controllers for connection to an external tester operable to facilitate programming of each of the plurality of pBIST controllers by the external tester, such that the plurality of pBIST controllers are operable to test the plurality of operational circuits in parallel; and status logic connected to the plurality of pBIST controllers operable to collect failure status from each of the plurality of pBIST controllers while they operate in parallel.

2. The integrated circuit of claim 1, wherein the status logic has an output for providing a status signal that indicates if any of the plurality of pBIST controllers has detected a failure during testing of the plurality of operational circuits.

3. The integrated circuit of claim 1, wherein one or more of the plurality operational circuits is a writable random access memory (RAM), and wherein the respective connected pBIST controller comprises:
a plurality of special functional units of differing types each controlled by a corresponding part of an alterable set of instructions, wherein the pBIST is operable to perform a sequence of memory test operations according to the alterable set of instructions; and
a results logger operable to detect an error by comparing data read from at least one RAM with expected results and operable to log information to identify the detected error.

4. The integrated circuit of claim 3, wherein the interface is operable to scan out logged error information from the plurality of pBIST controllers.

5. The integrated circuit of claim 1, wherein each of the plurality of pBIST controllers comprises:
an identification register coupled to the interface operable to receive identification data;
an identification circuit arranged to provide a unique ID value to each pBIST controller; and
a comparison circuit coupled to the identification register, to the identification circuit, and to the interface; the comparison circuit operable to allow programming of pBIST controller via the interface only when a value in the identification circuit is equal to either a broadcast ID value or to the unique ID value.

6. An integrated circuit comprising:
a plurality of operational circuits to be tested;
a plurality of programmable built-in self-test (pBIST) controllers connected to respective ones of the plurality of operational circuits, wherein each pBIST controller is operable to perform a sequence of memory test operations according to an alterable set of instructions, and operable to log information to identify a detected error;
an interface connected to each of the plurality of pBIST controllers for connection to an external tester operable to facilitate programming of each of the plurality of pBIST controllers by the external tester, such that the plurality of pBIST controllers are operable to test the plurality of operational circuits in parallel; and
status logic connected to the plurality of pBIST controllers operable to collect failure status from each of the plurality of pBIST controllers while they operate in parallel.

7. The integrated circuit of claim 6, wherein the status logic has an output for providing a status signal that indicates if any of the plurality of pBIST controllers has detected a failure during testing of the plurality of operational circuits.

8. The integrated circuit of claim 7, wherein each of the plurality of pBIST controllers comprises:
an identification register coupled to the interface operable to receive identification data;
an identification circuit arranged to provide a unique ID value to each pBIST controller; and
a comparison circuit coupled to the identification register, to the identification circuit, and to the interface; the comparison circuit operable to allow programming of pBIST controller via the interface only when a value in the identification circuit is equal to either a broadcast ID value or to the unique ID value.

9. The integrated circuit of claims 6 wherein the operational circuits are memory circuits.

10. The integrated circuit of claim 9, wherein the interface is operable to scan out logged error information from the plurality of pBIST controllers.

11. A method for testing an integrated circuit having a plurality of operational circuits, comprising:
programming a plurality of programmable built-in self-test (pBIST) controllers connected to respective ones of the plurality of operational circuits via a test interface provided on the integrated circuit;
starting the plurality of pBIST controllers after programming such that they perform tests on the operational circuits in a parallel manner;
logging data within each of the plurality of pBIST controllers to identify any detected failures in the operational circuits; and
monitoring the progress and results of the parallel testing via the test interface.

12. The method of claim 11, further comprising scanning out logged data from the plurality of pBIST controllers to identify a failure upon completion of the parallel testing.

13. The method of claim 11, wherein programming comprises:
selecting a first one of the plurality of pBIST controllers by sending a single identification value that is received by each of the plurality of pBIST controllers;
programming the first pBIST controller by sending a sequence of programming commands that is received by the selected first pBIST controller and is ignored by the rest of the plurality of pBIST controllers; and
repeating the operations of selecting and programming each pBIST controller until the plurality of pBIST controllers is programmed.

* * * * *